United States Patent
Nakahara

(10) Patent No.: US 8,889,053 B2
(45) Date of Patent: Nov. 18, 2014

(54) MOLD APPARATUS, INJECTION MOLDING APPARATUS, AND INJECTION MOLDING METHOD

(71) Applicant: Nissei ASB Machine Co., Ltd., Nagano (JP)

(72) Inventor: Atsushi Nakahara, Nagano (JP)

(73) Assignee: Nissei ASB Machine Co., Ltd., Nagano (JP)

(*) Notice: Subject to any disclaimer, the term of this patent is extended or adjusted under 35 U.S.C. 154(b) by 107 days.

(21) Appl. No.: 13/754,815

(22) Filed: Jan. 30, 2013

(65) Prior Publication Data

US 2013/0196020 A1  Aug. 1, 2013

(30) Foreign Application Priority Data

Jan. 31, 2012 (JP) ................. 2012-019261

(51) Int. Cl.
| | |
|---|---|
| B29C 45/36 | (2006.01) |
| B29D 22/00 | (2006.01) |
| B29C 45/80 | (2006.01) |
| B29C 45/26 | (2006.01) |
| B29C 45/56 | (2006.01) |
| B29K 105/00 | (2006.01) |

(52) U.S. Cl.
CPC ....... B29D 22/00 (2013.01); B29C 2945/76006 (2013.01); B29C 2945/76083 (2013.01); B29C 2045/563 (2013.01); B29K 2105/258 (2013.01); B29C 45/80 (2013.01); B29C 2945/76933 (2013.01); B29C 2945/76645 (2013.01); B29C 2945/76254 (2013.01); B29C 2945/76742 (2013.01); B29C 2945/76381 (2013.01); B29K 2105/253 (2013.01); B29C 45/261 (2013.01); B29C 45/56 (2013.01)

USPC ............... 264/328.7; 264/328.12; 425/533; 425/577

(58) Field of Classification Search
CPC .......... B29C 45/36; B29C 49/06; B29C 49/04
USPC ........... 425/525, 533, 577; 264/328.7, 328.12
See application file for complete search history.

(56) References Cited

U.S. PATENT DOCUMENTS

| | | | |
|---|---|---|---|
| 5,662,856 A | 9/1997 | Wunderlich | |
| 5,972,256 A * | 10/1999 | Wurst et al. | ................. 264/40.1 |
| 7,588,439 B2 * | 9/2009 | Mai et al. | ..................... 425/577 |
| 8,551,592 B2 * | 10/2013 | Atance Orden et al. | ... 428/36.91 |
| 2012/0242005 A1 | 9/2012 | Clarke | |
| 2014/0010909 A1 * | 1/2014 | McCready | .................... 425/525 |

FOREIGN PATENT DOCUMENTS

| | | | |
|---|---|---|---|
| CA | 2256090 | * | 6/2000 |
| EP | 0076980 | * | 9/1982 |
| GB | 909555 | * | 10/1962 |
| GB | 2445547A A | | 7/2008 |
| GB | 2453339 A | | 4/2009 |
| GB | 2474026 A | | 4/2011 |
| JP | H05220786 A | | 8/1993 |
| JP | 11-138582 | | 5/1999 |

* cited by examiner

*Primary Examiner* — Tim Heitbrink
(74) *Attorney, Agent, or Firm* — David L. Hoffman; Hoffman Patent Group

(57) ABSTRACT

A mold apparatus, an injection molding apparatus, and an injection molding method, which can satisfactorily form a preform having a bottom thicker than a body, are provided. The mold apparatus comprises a neck mold, an injection cavity mold, and an injection core mold having an inside core mold and an outside core mold, and further comprises a regulation means, such as an urging member, for regulating the movement of the inside core mold toward the outside of the injection cavity mold.

10 Claims, 6 Drawing Sheets

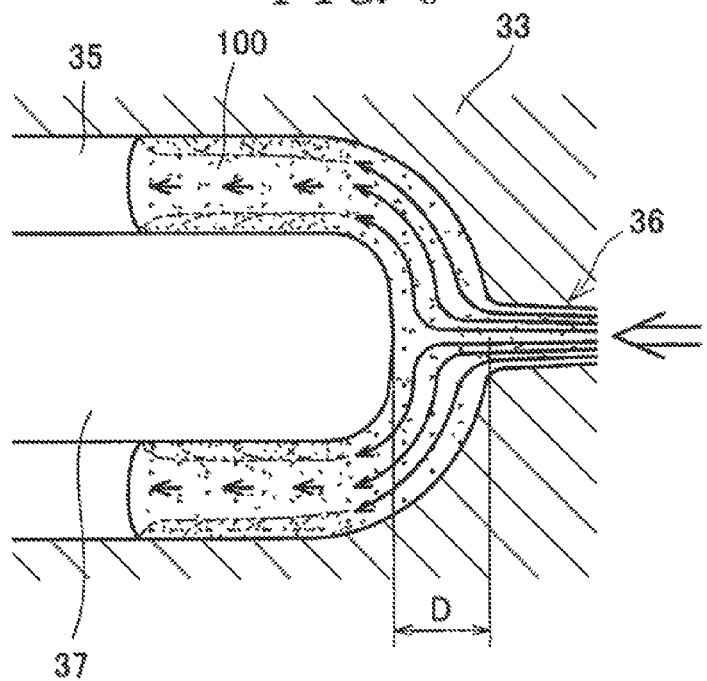
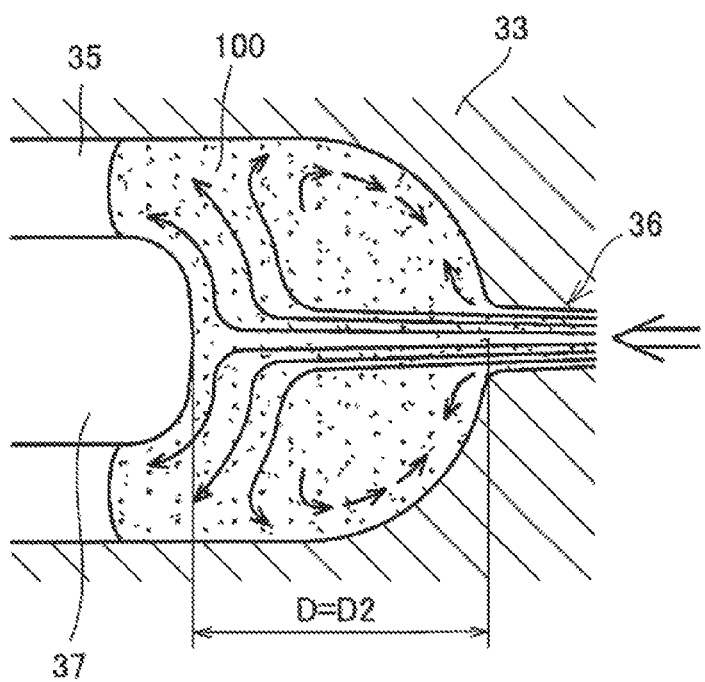

MOLD APPARATUS, INJECTION MOLDING APPARATUS, AND INJECTION MOLDING METHOD

CROSS REFERENCE TO RELATED APPLICATION(S)

This application claims the benefit of priority from Japanese Patent Application No. 2012-019261, which was filed on Jan. 31, 2012, and which is expressly incorporated by reference herein in its entirety.

BACKGROUND OF THE INVENTION

1. Field of the Invention

This invention relates to a mold apparatus, an injection molding apparatus, and an injection molding method, which are used for the injection molding of a preform.

2. Description of the Related Art

So far, containers made of glass have preferably been used as containers for accommodating toilet lotions, milky lotions, etc. (will hereinafter be referred to as cosmetics containers). This is because the glass containers have an aesthetic appearance such as a profound feel or a quality appearance, and tend to stimulate consumers' appetite for buying them.

In recent years, the aesthetic appearance of containers formed from resin has been improved, and the resin containers have been put to use as cosmetics containers. However, the resin containers are still difficult to form with an aesthetic appearance comparable to that of the glass containers.

The cosmetics containers formed of glass are often formed in a large wall thickness, for example, for the emphasis of a quality appearance or a profound feel. Although the shape of the container is modified, as appropriate, in accordance with the contents, it is common practice to render the bottom considerably thick-walled, and the body uniformly thin-walled compared with the bottom. Like the shape of the cosmetics container formed from glass, the cosmetics container formed from resin is also provided with a thick-walled bottom and a uniformly thin-walled body. By so doing, an improvement in its aesthetic appearance may be achievable.

Such a cosmetics container is produced, for example, by injection-molding a bottomed tubular preform with the use of a resin material, such as polyethylene terephthalate (PET), as a raw material, and blow-molding this preform. When the bottom of the cosmetics container is to have a thick wall, it is necessary to impart a large wall thickness to the bottom of the preform.

The preform is generally formed by injecting and charging a molten resin into an injection space defined by a neck mold, an injection cavity mold, and an injection core mold (see, for example, Patent Document 1). In forming the preform by injection molding, the spacing between the injection cavity mold and the injection core mold is set to be wide. By this measure, the bottom of the preform can be formed with a large thickness.

Patent Documents

Patent Document 1: JP-A-11-138582

SUMMARY OF THE INVENTION

Problems to be Solved by the Invention

Simply setting a wide spacing between the injection cavity mold and the injection core mold, however, poses the problems that wrinkles (a corrugated pattern around a gate portion) form on the surface of the bottom of the preform, and these wrinkles remain even after blow molding.

The present invention has been accomplished in the light of these circumstances. It is an object of the present invention to provide a mold apparatus, an injection molding apparatus, and an injection molding method which can satisfactorily form a preform having a bottom thicker than a body.

Means for Solving the Problems

A first aspect of the present invention, which solves the above-mentioned problems, is a mold apparatus for injection-molding a bottomed tubular preform having a neck with an opening portion at an upper end thereof, a body continuous with the neck, and a bottom continuous with the body and larger in wall thickness than the body, comprising: a neck mold for forming an outer surface of the neck; an injection cavity mold for forming outer surfaces of the body and the bottom of the preform; and an injection core mold for forming at least an inner surface of the preform, wherein the injection core mold includes an inside core mold, inserted into the injection cavity mold, for forming the inner surface of the preform, and an outside core mold, having a leading end portion clamped by the neck mold, for forming an upper end surface of the preform and holding the inside core mold slidably in accordance with a change in a pressure within an injection space, and the mold apparatus further comprises regulation means for regulating movement of the inside core mold toward an outside of the injection cavity mold.

A second aspect of the present invention is the mold apparatus according to the first aspect, wherein the inside core mold is adapted to be movable by a predetermined distance toward the outside of the injection cavity mold if the pressure within the injection space reaches a predetermined pressure or higher during injection molding of the preform.

A third aspect of the present invention is the mold apparatus according to the first or second aspect, wherein the regulation means is an urging member for urging the inside core mold toward an interior of the injection cavity mold by a predetermined urging force.

A fourth aspect of the present invention is an injection molding apparatus comprising the mold apparatus according to any one of the first to third aspects.

A fifth aspect of the present invention is an injection molding method for a preform using the injection molding apparatus according to the fourth aspect, comprising: injecting a raw material continuously into the injection space to charge the raw material into the injection space while moving the inside core mold from a first position to a second position; and then cooling the raw material within the injection space to solidify the raw material, while holding the inside core mold at the second position by continuing injection of the raw material into the injection space.

A sixth aspect of the present invention is the injection molding method for a preform according to the fifth aspect, further comprising injecting the raw material into the injection space, while cooling the injection cavity mold and the injection core mold which define the injection space.

Effects of the Invention

According to the present invention described above, the preform having the bottom thicker than the body can be satisfactorily formed, without wrinkles being generated on the surface of the bottom. By blow-molding this preform, the container with the bottom thicker than the body can be formed with a good appearance. Even if the injection speed is rendered relatively high, the occurrence of wrinkles can be suppressed. Hence, the molding time of the preform can be shortened, and the manufacturing cost can be reduced.

BRIEF DESCRIPTION OF THE DRAWINGS

FIG. 6 is a view schematically showing the state of a resin material within an injection space during injection molding.

FIG. 7 is a view schematically showing the state of the resin material within the injection space during injection molding.

DESCRIPTION OF THE PREFERRED EMBODIMENT(S)

Embodiments of the present invention will now be described in detail by reference to the accompanying drawings.

Figure 1:
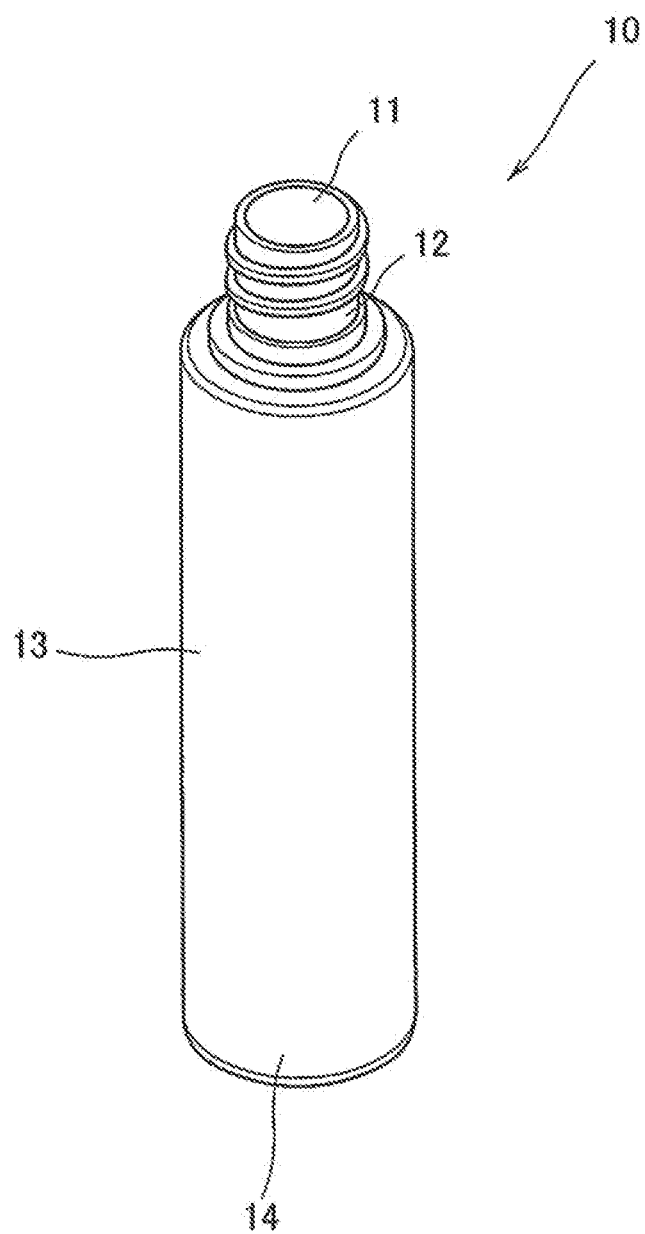
FIG. 1 is an appearance drawing showing an example of a container according to the present invention.
Figure 2:
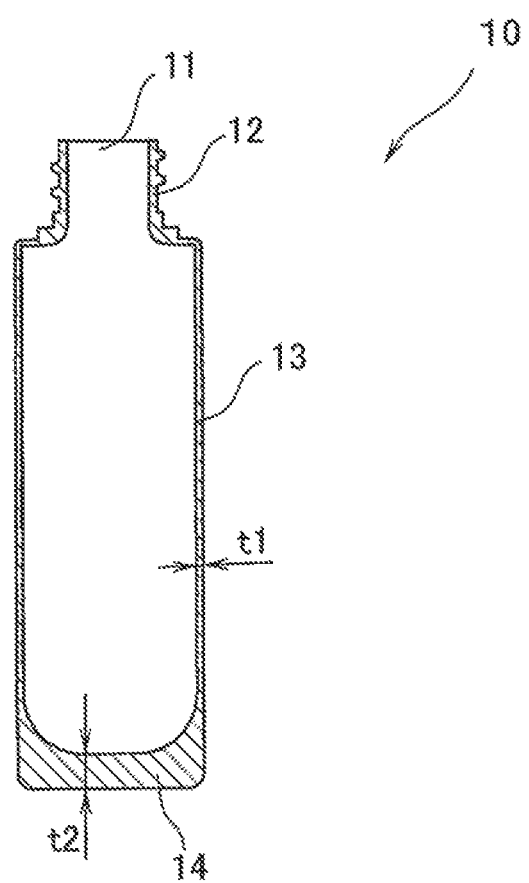
FIG. 2 is a sectional view showing the example of the container according to the present invention.
Figure 3:
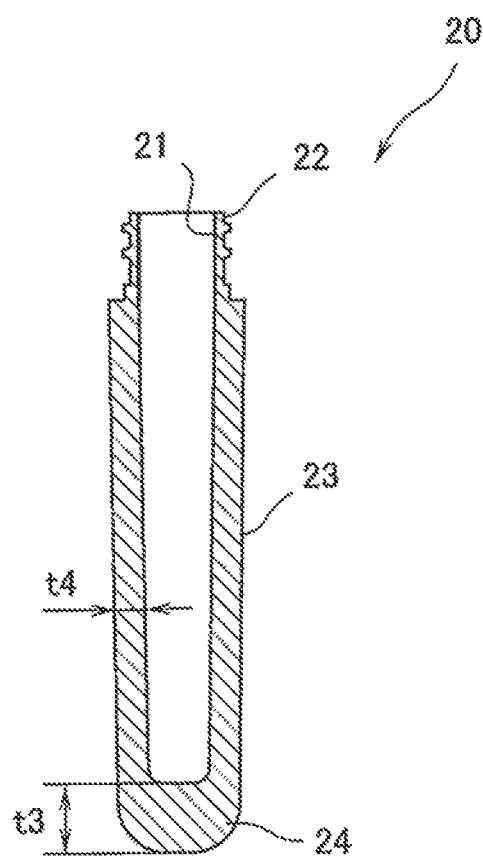
FIG. 3 is a sectional view of a preform according to the present invention.

FIG. 1 is a perspective view showing the appearance of a container according to an embodiment of the present invention. FIG. 2 is a sectional view of the container. FIG. 3 is a sectional view of an injection-molded preform.

A container (cosmetics container) 10 shown in FIG. 1 is formed from polyethylene terephthalate (PET), and accommodates, for example, a toilet lotion or a milky lotion. This container 10 is composed of a neck 12 having a mouth 11 at the upper end, a tubular body 13 continuous with the neck 12, and a bottom 14 continuous with the body 13. The bottom 14 of the cosmetics container 10 is formed with a thickness considerably larger than the wall thickness of the body 13. That is, the wall thickness of the body 13 is considerably smaller than the thickness of the bottom 14, and is also rendered uniform. In the present embodiment, for example, the wall thickness t1 of the body 13 is set at 1 mm, while the wall thickness t2 of the bottom 14 is set at 5 mm.

By providing the container 10 with the above shape, an image of the container 10 can be brought close to the consumers' image of the cosmetics container. That is, the aesthetic appearance of the container 10 can be improved, so that the container 10 can be used as a cosmetics container or the like whose appearance matters.

Such a container 10 is formed by blow-molding a preform formed by injection molding.

As shown in FIG. 3, a preform 20 for blow molding of the container 10 is composed of a neck 22 having an opening portion 21 at the upper end and having a thread groove formed at the outer periphery, a body 23 continuous with the neck 22, and a bottom 24 continuous with the body 23. The bottom 24 of the preform 20 is formed with a considerable thickness. For example, the wall thickness t3 of the bottom 24 is equal to or larger than the wall thickness t4 of the body 23. In the present embodiment, t3 is set to be within the range of 2.5 mm to 15.0 mm, for example, at 15.0 mm, and t4 is set within the range of 2.5 mm to 5.0 mm, for example, at 5.0 mm, so that t3/t4 is in the range of 1 to 3.

When the preform 20 having the bottom 24 larger in wall thickness than the body 23 is to be formed by injecting molding, wrinkles tend to form on the surface of the bottom 24. An injection molding apparatus equipped with a mold apparatus according to the present invention which will be described below, on the other hand, can satisfactorily form the preform 20 having a relatively thick-walled bottom 24, without generating wrinkles on the surface of the bottom 24.

Figure 4:
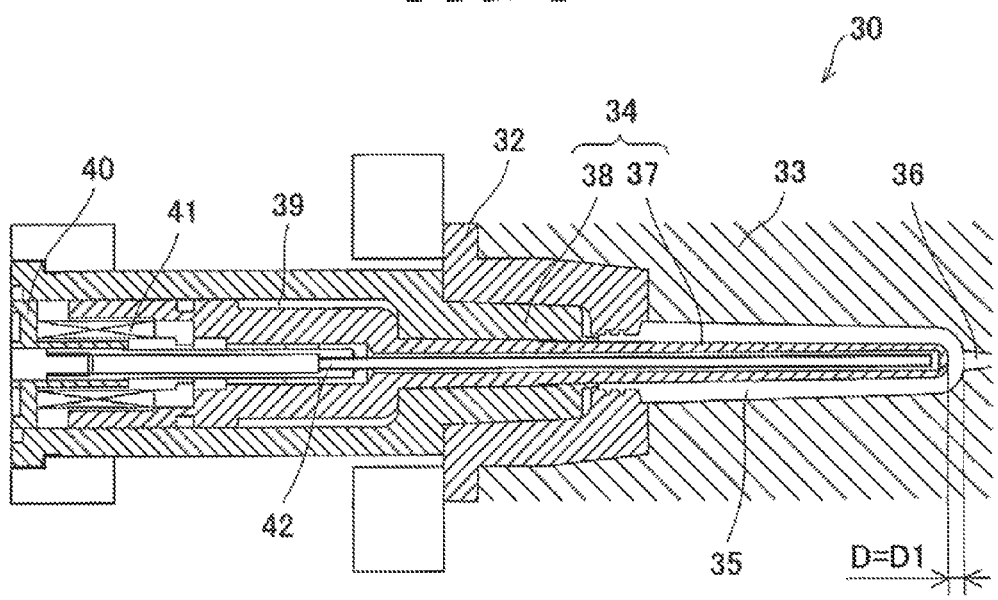
FIG. 4 is a sectional view showing the schematic configuration of a mold apparatus according to an embodiment of the present invention.
Figure 5:
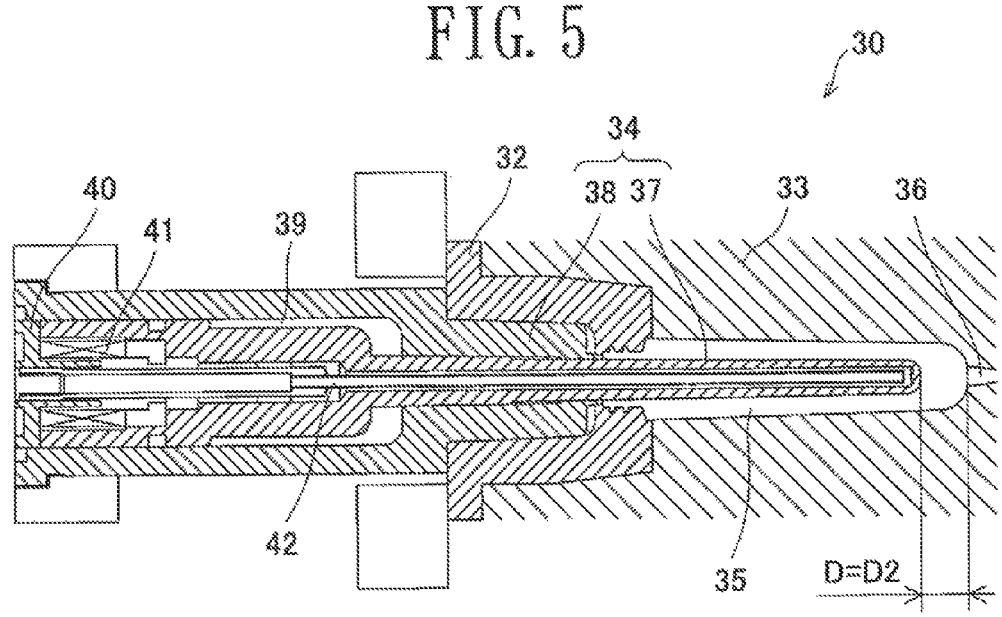
FIG. 5 is a sectional view showing the schematic configuration of the mold apparatus according to the embodiment of the present invention.

FIGS. 4 and 5 are sectional views showing the schematic configuration of the mold apparatus provided in the injection molding apparatus according to an embodiment of the present invention.

As shown in FIG. 4, a mold apparatus 30 is equipped with a neck mold 32, an injection cavity mold 33, and an injection core mold 34. The neck mold 32 forms the outer surface of the neck 22 of the preform 20. The injection cavity mold 33 forms the outer surface of the body 23 and the bottom 24 of the preform. The injection core mold 34 forms at least the inner surface of the preform 20. An injection space 35 defined by the neck mold 32, the injection cavity mold 33, and the injection core mold 34 is charged with a resin material (for example, PET resin) as a raw material, whereby the preform 20 of a desired shape is formed. The resin material being the raw material is pressurized in an injection section (not shown), and injected into the injection space 35 through a gate 36 provided at the center of the bottom of the injection cavity mold 33. Since the constitution of the injection is publicly known, its explanation will be omitted herein.

The injection core mold 34 includes an inside core mold 37 and an outside core mold 38. The inside core mold 37 is inserted into the injection cavity mold 33 to form the inner surface of the preform 20. The outside core mold 38 has a leading end clamped by the neck mold 32 to form the upper end surface of the preform 20 where the opening portion 21 opens. The outside core mold 38 holds the inside core mold 37 slidably. That is, the inside core mold 37 is held by the outside core mold 38 in such a manner as to be slidable in accordance with a change in the pressure within the injection space 35. Concretely, the outside core mold 38 has an insertion hole 39 into which the inside core mold 37 is inserted. A press plate 40 is fixed to a proximal end portion of the outside core mold 38. The insertion hole 39 of the outside core mold 38 accommodating the inside core mold 37 is closed with the press plate 40.

The inside core mold 37 has its movement, toward the outside of the injection cavity mold 33, regulated by a regulation means. As a result, the inside core mold 37 is adapted to be movable by a predetermined distance toward the outside of the injection cavity mold 33 if the interior of the injection space is at a predetermined pressure or higher during the injection molding of the preform 20.

In the present embodiment, an urging member 41 as the regulation means is provided in a proximal end portion of the inside core mold 37. The urging member 41 is composed of a spring member such as a coil spring, and is housed, together with the inside core mold 37, within the insertion hole 39 of the outside core mold 38. That is, the urging member 41 is held between the inside core mold 37 and the press plate 40. Thus, the inside core mold 37 is always urged by a predetermined urging force toward the injection cavity mold 33. If the pressure within the injection space 35 reaches the predetermined pressure or higher and becomes the urging force of the urging member 41 when the preform 20 is injection-molded, the inside core mold 37 moves by the predetermined distance toward the outside of the injection cavity mold 33. The timing with which the movement of the inside core mold 37 starts can be adjusted by changing the urging force of the urging member 41.

The inside core mold 37 is configured such that cooling water can be circulated within it. In the present embodiment, the inside core mold 37 is formed in a hollow shape, and the interior of the inside core mold 37 is provided with a cooling pipe 42 along with the urging member 41. The cooling pipe 42 is provided continuously up to a site near the leading end of the inside core mold 37. A path where cooling water circulates between the interior and the exterior of the cooling pipe 42 is formed. The injection cavity mold 33 can also be cooled, for example, by circulating cooling water therethrough, although this is not shown.

Next, a method for injection molding of the preform 20 using the mold apparatus 30 of the above-described configuration will be described.

At a point in time at which the injection molding of the preform 20 is started (i.e., in the initial state), the inside core mold 37 has been inserted most deeply into the injection cavity mold 33 by the urging force of the urging member 41. That is, the inside core mold 37 is located at a first position where its distance D from the bottom surface of the injection cavity mold 33 is the shortest distance D1 (see FIG. 4). In the present embodiment, the distance D1 between the inside core mold 37 and the bottom surface of the injection cavity mold 33 in the initial state is set at about 5 mm.

When the injection molding is started to inject the resin material (raw material) into the injection space 35 through the gate 36, the resin material is gradually charged into the injection space 35. At an initial stage, the distance D between the inside core mold 37 and the injection cavity mold 33 is relatively short. Thus, a resin material 100 injected into the injection space 35 flows in along the surfaces of the inside core mold 37 and the injection cavity mold 33, as indicated by arrows in FIG. 6. During the injection molding, the injection cavity mold 33, the inside core mold 37, etc. forming the injection space 35 are cooled. Hence, the resin material 100 injected from the gate 36 is charged into the injection space 35 while being sequentially solidified, beginning at a part contacting the surfaces of the injection cavity mold 33 and the inside core mold 37. In the present embodiment, the injection cavity mold 33 and the inside core mold 37 forming the injection space 35 are cooled, but if required, the neck mold 32 may be cooled in addition.

As the charging of the resin material 100 proceeds, the pressure within the injection space 35 rises, and the pressure on the inside core mold 37 from the resin material 100 increases. When the charging of the resin material 100 proceeds to a certain degree, the pressure that the inside core mold 37 receives from the resin material 100 becomes higher than the urging force applied by the urging member 41. Consequently, as shown in FIG. 5, the inside core mold 37 moves by a predetermined distance toward the outside of the injection cavity mold 33 (leftward in the drawing). In the present embodiment, when the resin material 100 is charged to a site corresponding to a site below the neck of the preform 20 (i.e., a site near the boundary between the neck 22 and the body 23), the movement of the inside core mold 37 starts. As the inside core mold 37 moves, the injection space 35 gradually expands, and a region where the resin material 100 is flowable gradually enlarges. However, the region does not enlarge suddenly. When the proximal end of the inside core mold 37 (the end opposite to the leading end) contacts the press plate 40, the movement of the inside core mold 37 stops. That is, the inside core mold 37 is held at a second position where its distance D from the bottom surface of the injection cavity mold 33 is the longest distance D2. In the present embodiment, the wall thickness t3 of the bottom 24 of the preform 20 is set at 15.0 mm. Thus, the distance over which the inside core mold 37 moves is set at about 10.0 mm, making the distance D2 about 15.0 mm.

Then, when the pressure within the injection space 35 reaches the predetermined pressure, the resin material 100 is cooled, with this pressure being held for a predetermined period of time. That is, while the gate 36 is kept open, the injection of the resin material 100 is continued, and the resin material 100 within the injection space 35 is cooled, with the inside core mold 37 being held at the second position. Further, the gate 36 is closed, and the resin material 100 charged into the injection space 35 is cooled. Once the surface temperature of the resin material 100 lowers to a temperature of the order of 90 C to 100 C as a result of this cooling, the resin material is released from the mold to complete the preform 20.

Figure 8:
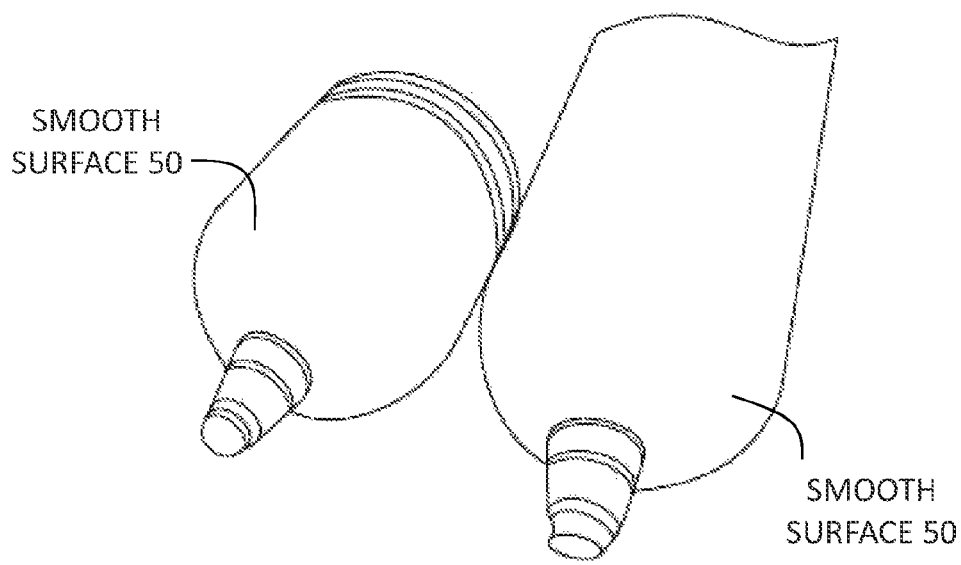
FIG. 8 is an illustration showing the state of occurrence of wrinkles (without wrinkles) on the surface of the bottom of the preform.

The foregoing injection molding method can satisfactorily form the preform 20 in which the thickness of the bottom 24 is greater than the thickness of the body 23. Concretely, the distance D between the inside core mold 37 and the bottom surface of the injection cavity mold 33 is increased in accordance with a rise in the pressure within the injection space 35, whereby the resin material 100 can be injected into the injection space 35 smoothly. In other words, the resin material 100 can be injected and charged gradually, rather than abruptly, into a wide region of the injection space 35 corresponding to the bottom 24 of the preform 20. Consequently, the occurrence of wrinkles on the surface of the bottom 24 of the preform 20 can be prevented, as in FIG. 8 which illustrates a smooth surface 50.

Moreover, the injection speed is substantially not restricted, and the occurrence of wrinkles can be suppressed, even if the injection speed is rendered relatively high. Thus, the molding time of the preform can be shortened, and the manufacturing cost can be reduced.

The inside core mold 37 can be moved independently for each injection space 35. Even if the injection molding apparatus has a plurality of the mold apparatuses, therefore, it is possible to deal appropriately with variations in the injection pressure or injecting timing among the injection spaces 35 which are likely to be caused by the manufacture of multiple molding products. Hence, the present invention can satisfactorily carry out the molding of a multiplicity of the preforms 20 having a thickened bottom 24.

Figure 9:
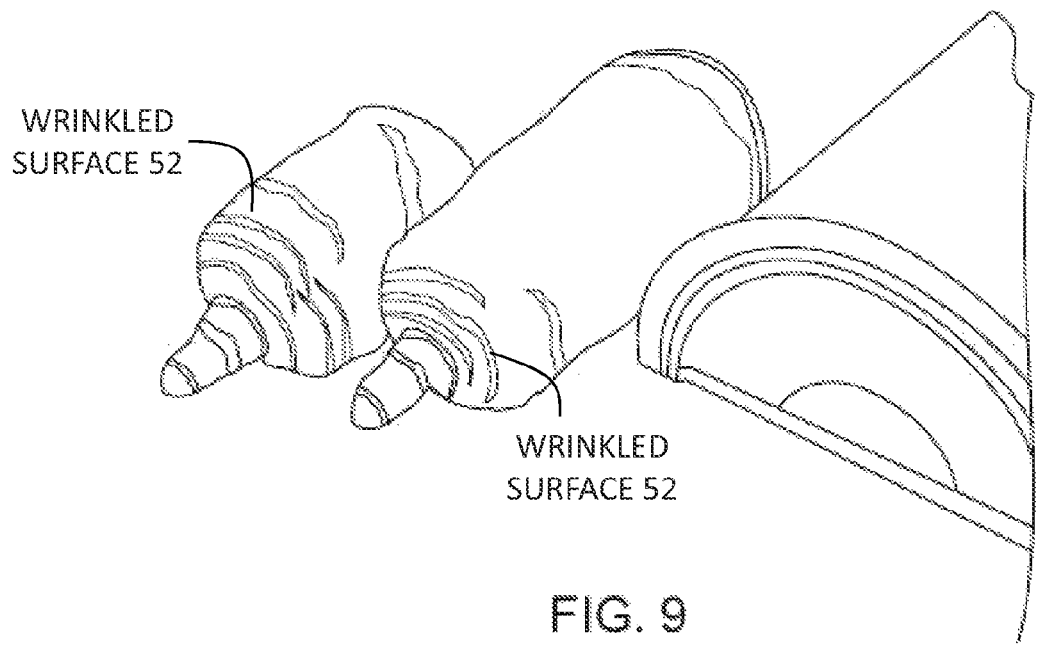
FIG. 9 is an illustration showing the state of occurrence of wrinkles (with wrinkles) on the surface of the bottom of the preform.

Even if the distance D between the inside core mold 37 and the bottom surface of the injection cavity mold 33 is fixed at the thickness of the bottom 24 of the preform 20 (i.e., distance D2), as shown in FIG. 7, the preform 20 having the bottom 24 thicker than the body 23 can be formed. However, a disturbance in the flow of the resin material 100 occurs, for example, flows of the resin material 100 toward the gate 36 form, as indicated, for example, by arrows in the drawing. Probably because of such a disturbance in the flow, wrinkles are formed on the surface of the bottom 24 of the injection-molded preform 20, as shown in FIG. 9, which includes a wrinkled surface 52. The occurrence of wrinkles is minimized by slowing down the injection speed extremely, but it is difficult to suppress their occurrence fully. Moreover, the injection speed is difficult to control, and the molding time becomes longer.

With the injection molding method according to the present invention, moreover, the resin material 100 charged into the injection space 35 is cooled, with the pressure within the injection space 35 being held at the predetermined pressure, as mentioned above. This means that even when the resin material 100 shrinks upon cooling, a fresh resin material 100 is charged in a corresponding amount, and the resin material 100 is cooled, with the inside core mold 37 being held at the second position. Thus, the bottom 24 of the preform 20 can be formed in a desired thickness. Then, the gate 36 is closed, and the resin material 100 is further cooled. However, the amount of shrinkage of the resin material 100 at this stage is very small.

The preform 20 injection-molded in this manner has its temperature and wall thickness adjusted to the desired state, for example, by a temperature controller. Then, the preform 20 is blow-molded by a blow molding device to form the container 10 (see FIG. 1). By this procedure, the hollow container 10 with the bottom 14 larger in wall thickness than the body 13 can be formed with a good appearance. Thus, the container 10 can be used, for example, as a cosmetics container whose appearance matters.

The embodiment of the present invention has been described above. It goes without saying, however, that the present invention is not limited to this embodiment, and various changes and modifications may be made, as appropriate, without departing from the gist of the present invention.

The above embodiment, for example, has illustrated the configuration in which the mold apparatus has the urging member as the regulation means. However, the features of the regulation means are not limited, and may be those which can regulate the movement of the inside core mold toward the outside of the injection cavity mold.

EXPLANATIONS OF LETTERS OR NUMERALS

10 Container (cosmetics container)
11 Mouth
12 Neck
13 Body
14 Bottom
20 Preform
21 Opening portion
22 Neck
23 Body
24 Bottom
30 Mold apparatus
32 Neck mold
33 Injection cavity mold
34 Injection core mold
35 Injection space
36 Gate
37 Inside core mold
38 Outside core mold
39 Insertion hole
40 Press plate
41 Urging member
42 Cooling pipe
50 Smooth surface
52 Wrinkled surface
100 Resin material Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. An injection molding method for a preform using an injection molding apparatus comprising a mold apparatus for injection-molding a bottomed tubular preform having a neck with an opening portion at an upper end thereof, a body continuous with the neck, and a bottom continuous with the body and larger in wall thickness than the body, comprising a neck mold for forming an outer surface of the neck; an injection cavity mold for forming outer surfaces of the body and the bottom of the preform; and an injection core mold for forming at least an inner surface of the preform, wherein the injection core mold includes an inside core mold, inserted into the injection cavity mold, for forming the inner surface of the preform, and an outside core mold, having a leading end portion clamped by the neck mold, for forming an upper end surface of the preform and holding the inside core mold slidably in accordance with a change in a pressure within an injection space, and the mold apparatus further comprises regulation means for regulating movement of the inside core mold toward an outside of the injection cavity mold, the method comprising:
   injecting a raw material continuously into the injection space to charge the raw material into the injection space while moving the inside core mold from a first position to a second position; and
   then cooling the raw material within the injection space to solidify the raw material, while holding the inside core mold at the second position by continuing injection of the raw material into the injection space.

2. The injection molding method of claim 1, further comprising:
   injecting the raw material into the injection space, while cooling the injection cavity mold and the injection core mold which define the injection space.

3. A mold apparatus for injection-molding a bottomed tubular preform having a neck with an opening portion at an upper end thereof, a body continuous with the neck, and a bottom continuous with the body and larger in wall thickness than the body, comprising:
   a neck mold for forming an outer surface of the neck;
   an injection cavity mold for forming outer surfaces of the body and the bottom of the preform; and
   an injection core mold for forming at least an inner surface of the preform,
   wherein the injection core mold includes
      an inside core mold, inserted into the injection cavity mold, for forming the inner surface of the preform, and
      an outside core mold, having a leading end portion clamped by the neck mold, for forming an upper end surface of the preform and holding the inside core mold slidably in accordance with a change in a pressure within an injection space, and
      the mold apparatus further comprises regulation means for regulating movement of the inside core mold toward an outside of the injection cavity mold.

4. The mold apparatus of claim 3, wherein the inside core mold is adapted to be movable by a predetermined distance toward the outside of the injection cavity mold if the pressure within the injection space reaches a predetermined pressure or higher during injection molding of the preform.

5. The mold apparatus of claim 3, wherein the regulation means is an urging member for urging the inside core mold toward an interior of the injection cavity mold by a predetermined urging force.

6. An injection molding apparatus comprising a mold apparatus for injection-molding a bottomed tubular preform having a neck with an opening portion at an upper end thereof, a body continuous with the neck, and a bottom continuous with the body and larger in wall thickness than the body, comprising a neck mold for forming an outer surface of the neck; an injection cavity mold for forming outer surfaces of the body and the bottom of the preform; and an injection core mold for forming at least an inner surface of the preform, wherein the injection core mold includes an inside core mold, inserted into the injection cavity mold, for forming the inner surface of the preform, and an outside core mold, having a leading end portion clamped by the neck mold, for forming an upper end surface of the preform and holding the inside core mold slidably in accordance with a change in a pressure within an injection space, and the mold apparatus further comprises regulation means for regulating movement of the inside core mold toward an outside of the injection cavity mold.

7. The mold apparatus of claim 4, wherein the regulation means is an urging member for urging the inside core mold toward an interior of the injection cavity mold by a predetermined urging force.

8. The injection molding apparatus of claim 6, wherein the inside core mold is adapted to be movable by a predetermined distance toward the outside of the injection cavity mold if the pressure within the injection space reaches a predetermined pressure or higher during injection molding of the preform.

9. The injection molding apparatus of claim 6, wherein the regulation means is an urging member for urging the inside core mold toward an interior of the injection cavity mold by a predetermined urging force.

10. The injection molding apparatus of claim 8, wherein the regulation means is an urging member for urging the inside core mold toward an interior of the injection cavity mold by a predetermined urging force.

* * * * *